(12) United States Patent
Hayashi (10) Patent No.: US 10,125,727 B2
(45) Date of Patent: Nov. 13, 2018

(54) INTERNAL COMBUSTION ENGINE

(71) Applicant: TOYOTA JIDOSHA KABUSHIKI KAISHA, Toyota-shi, Aichi-ken (JP)

(72) Inventor: Atsushi Hayashi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/126,840

(22) PCT Filed: Mar. 12, 2015

(86) PCT No.: PCT/JP2015/058151
§ 371 (c)(1),
(2) Date: Sep. 16, 2016

(87) PCT Pub. No.: WO2015/141754
PCT Pub. Date: Sep. 24, 2015

(65) Prior Publication Data
US 2017/0101968 A1    Apr. 13, 2017

(30) Foreign Application Priority Data

Mar. 18, 2014    (JP) ................................ 2014-055359

(51) Int. Cl.
*F02M 35/10*    (2006.01)
*F02M 26/04*    (2016.01)
(Continued)

(52) U.S. Cl.
CPC ..... *F02M 35/10222* (2013.01); *F02B 37/127* (2013.01); *F02B 37/168* (2013.01);
(Continued)

(58) Field of Classification Search
CPC ........ F02M 26/04; F02M 26/06; F02M 26/14; F02M 26/20; F02M 26/36;
(Continued)

(56) References Cited

U.S. PATENT DOCUMENTS

| 7,011,080 B2 | 3/2006 | Kennedy |
| 2010/0107631 A1 | 5/2010 | Pearson |

(Continued)

FOREIGN PATENT DOCUMENTS

| CN | 104373198 A | 2/2015 |
| DE | 10 2009 046016 A1 | 5/2010 |

(Continued)

*Primary Examiner* — Audrey K Bradley
(74) *Attorney, Agent, or Firm* — Hunton Andrews Kurth LLP (57) ABSTRACT

An EGR channel and an EGR valve are provided for introducing EGR gas into an intake channel upstream of a compressor that supercharges intake air. There is provided an intake bypass channel that connects the intake channel downstream of the compressor and the EGR channel immediately downstream the EGR valve along the direction of the flow of the EGR gas to each other, and a bypass valve capable of selecting a configuration of an intake air flow channel from among a first channel in which the intake air having passed through the compressor passes through the intake channel and flows into a cylinder and a second channel in which the state where the EGR valve is closed, part of the intake air having passed through the compressor passes through the intake bypass channel and the EGR channel and is recirculated to a part upstream of the compressor.

5 Claims, 7 Drawing Sheets

(51) Int. Cl.
*F02M 26/06* (2016.01)
*F02M 26/14* (2016.01)
*F02M 26/36* (2016.01)
*F02M 26/50* (2016.01)
*F02B 37/16* (2006.01)
*F02B 37/12* (2006.01)
*F02D 41/00* (2006.01)
*F02D 41/06* (2006.01)
*F02M 26/20* (2016.01)

(52) U.S. Cl.
CPC ..... *F02D 41/0007* (2013.01); *F02D 41/0055* (2013.01); *F02D 41/0065* (2013.01); *F02D 41/068* (2013.01); *F02M 26/04* (2016.02); *F02M 26/06* (2016.02); *F02M 26/14* (2016.02); *F02M 26/20* (2016.02); *F02M 26/36* (2016.02); *F02M 26/50* (2016.02); *F02M 35/10157* (2013.01); *F02M 35/10255* (2013.01); *Y02T 10/144* (2013.01); *Y02T 10/47* (2013.01)

(58) Field of Classification Search
CPC ......... F02M 3/10157; F02M 35/10222; F02M 35/102555; F02B 37/168; F02D 41/0007; F02D 41/0065
See application file for complete search history.

(56) References Cited

U.S. PATENT DOCUMENTS

| | | |
|---|---|---|
| 2012/0090584 A1 | 4/2012 | Jung |
| 2013/0019848 A1 | 1/2013 | Noguchi |
| 2015/0047340 A1* | 2/2015 | Ulrey ..................... F02B 47/08 60/600 |
| 2015/0047347 A1 | 2/2015 | Ulrey et al. |

FOREIGN PATENT DOCUMENTS

| | | |
|---|---|---|
| JP | 2007-198310 A | 8/2007 |
| JP | 2010-255565 A | 11/2010 |
| JP | 2012-087779 A | 5/2012 |
| WO | 2008/099248 A1 | 8/2008 |

* cited by examiner

Fig. 3A
EGR VALVE HEATING MODE

Fig. 3B
CONDENSATE WATER PURGING MODE

Fig. 3C
EGR GAS INTRODUCTION MODE

EGR VALVE
HEATING MODE

Fig. 8B

CONDENSATE WATER
PURGING MODE

Fig. 8C

EGR GAS
INTRODUCTION MODE

EGR VALVE HEATING MODE

Fig. 10B

EGR GAS INTRODUCTION MODE

*Fig. 11*

INTERNAL COMBUSTION ENGINE

CROSS-REFERENCE TO RELATED APPLICATIONS

This is a national phase application based on the PCT International Patent Application No. PCT/JP2015/058151 filed Mar. 12, 2015, claiming priority to Japanese Patent Application No. 2014-055359 filed Mar. 18, 2014, the entire contents of both of which are incorporated herein by reference.

TECHNICAL FIELD

The present invention relates to an internal combustion engine, and in particular, an internal combustion engine to which an EGR gas can be introduced.

BACKGROUND ART

For example, the patent literature 1 discloses a conventional internal combustion engine provided with a turbocharger. The internal combustion engine includes an intercooler that cools supercharged intake air and an EGR cooler that cools EGR gas introduced into an intake channel upstream of a compressor. The amount of EGR gas is controlled to prevent water condensation in the intercooler and the EGR cooler.

CITATION LIST

Patent Literature

[Patent Literature 1] Japanese Patent Laid-Open No. 2012-087779

SUMMARY OF INVENTION

Technical Problem

Consider a configuration in which an EGR valve that adjusts the flow rate of EGR gas flowing in an EGR channel is provided at a midpoint in the EGR channel. In the early stage of warm-up after starting from the cold state, water condensation tends to occur, so that the EGR valve is closed. Even if the EGR valve is closed, however, the EGR channel upstream of the EGR valve along the flow of the EGR gas is filled with exhaust gas because of exhaust pulsation, and gas exchange constantly occurs there. Therefore, moisture in the exhaust gas can condense on the cold EGR valve. Thus, in the cold state during which the EGR valve is closed, water condensation can occur on the surface of the EGR valve on the side of the exhaust channel and its vicinity.

If the EGR valve is opened to introduce the EGR gas without any consideration on the occurrence of water condensation on the EGR valve described above, the condensate water flows into the intake channel. However, if introduction of the EGR gas is inhibited until the internal combustion engine is completely warmed up and the condensate water on the EGR valve disappears, the effect of the EGR gas introduction on improvement of the fuel consumption cannot be achieved.

The present invention has been devised to solve the problems described above, and an object of the present invention is to provide an internal combustion engine that can quickly heat an EGR valve and start introducing EGR gas early in the state where there is no condensate water on the EGR valve and its periphery.

Solution to Problem

A first aspect of the present invention is an internal combustion engine, comprising: a compressor that supercharges intake air, an EGR channel, an EGR valve, an intake bypass channel, and flow channel switching means. The EGR channel connects an intake channel upstream of the compressor and an exhaust channel to each other. The EGR valve is disposed at a midpoint in the EGR channel and adjusts the flow rate of EGR gas flowing in the EGR channel. The intake bypass channel connects the intake channel downstream of the compressor and the EGR channel immediately downstream the EGR valve along a direction of a flow of the EGR gas. The flow channel switching means is capable of selecting a configuration of a flow channel of the intake air flowing in the intake channel from among a first flow channel configuration and a second flow channel configuration. In the first flow channel configuration, the intake air having passed through the compressor passes through the intake channel and flows into a cylinder. In the second flow channel configuration, in a state where the EGR valve is closed, part of the intake air having passed through the compressor passes through the intake bypass channel and the EGR channel and is recirculated to the intake channel upstream of the compressor.

According to a second aspect of the present invention, in the first aspect of the present invention, the flow channel switching means is capable of selecting not only the first flow channel configuration or the second flow channel configuration but also a third flow channel configuration. In the third flow channel configuration, in a state where the EGR valve is opened, part of the intake air flowing in the intake channel upstream of the compressor passes through the intake bypass channel and the EGR channel and flows out into the exhaust channel.

According to a third aspect of the present invention, in the first or second aspect of the present invention, the internal combustion engine further comprises first controlling means. The first controlling means controls the flow channel switching means to select the second flow channel configuration in a case where water condensation occurs on the EGR valve or there is a possibility that water condensation occurs on the EGR valve in the state where the EGR valve is closed.

According to a fourth aspect of the present invention, in the second aspect of the present invention, the internal combustion engine further comprises second controlling means. The second controlling means controls the EGR valve and the flow channel switching means to select the third flow channel configuration in a case where water condensation occurs in the EGR channel upstream of the EGR valve or there is a possibility that water condensation occurs in the EGR channel upstream of the EGR valve.

According to a fifth aspect of the present invention, in the second aspect of the present invention, the internal combustion engine further comprises third controlling means. The third controlling means controls the flow channel switching means to select the second flow channel configuration in the state where the EGR valve is closed in a case where warm-up of the internal combustion engine is started. Further, the third controlling means controls the EGR valve and the flow channel switching means to select the third flow channel configuration before introducing the EGR gas from the EGR channel into the intake channel in a case where water condensation no longer occurs on the EGR valve when the second flow channel configuration is selected.

Advantageous Effects of Invention

According to a first aspect of the present invention, if the second flow channel configuration is selected in the cold state during which the EGR valve is closed, part of the intake air increased in temperature by the compressor can be made to flow into the EGR channel via the intake bypass channel and flow through the EGR channel while being contact with the EGR valve. As a result, the EGR valve can be heated by the heat of the intake air. In this way, occurrence of water condensation on the EGR valve can be prevented, or any condensate water can be removed (evaporated). Thus, there can be provided an internal combustion engine capable of quickly heating the EGR valve and starting EGR gas introduction early in the state where there is no condensate water on the EGR valve and its periphery.

According to a second aspect of the present invention, if the third flow channel configuration is selected under the condition where the EGR channel is cold, any condensate water dwelling in the EGR channel can be pushed to the exhaust channel and removed by the intake air flowing into the intake bypass channel and flowing back through the EGR channel.

According to a third aspect of the present invention, in the case where water condensation has occurred, or can occur, on the EGR valve, the EGR valve can be heated by the heat of the intake air introduced through the intake bypass channel. In this way, occurrence of water condensation on the EGR valve can be prevented, or any condensate water can be removed (evaporated).

According to a fourth aspect of the present invention, in the case where water condensation has occurred, or can occur, in the EGR channel upstream of the EGR valve, the condensate water dwelling in the EGR channel can be pushed to the exhaust channel and removed by the intake air. Thus, the EGR gas can be introduced in the state where not only the condensate water on the EGR valve and its periphery but also the condensate water in the EGR device is eliminated with higher reliability.

According to a fifth aspect of the present invention, the EGR gas can be introduced early in the state where any condensate water in the EGR device is eliminated with higher reliability.

DESCRIPTION OF EMBODIMENTS

Embodiment 1

[System Configuration of Internal Combustion Engine]

Figure 1:
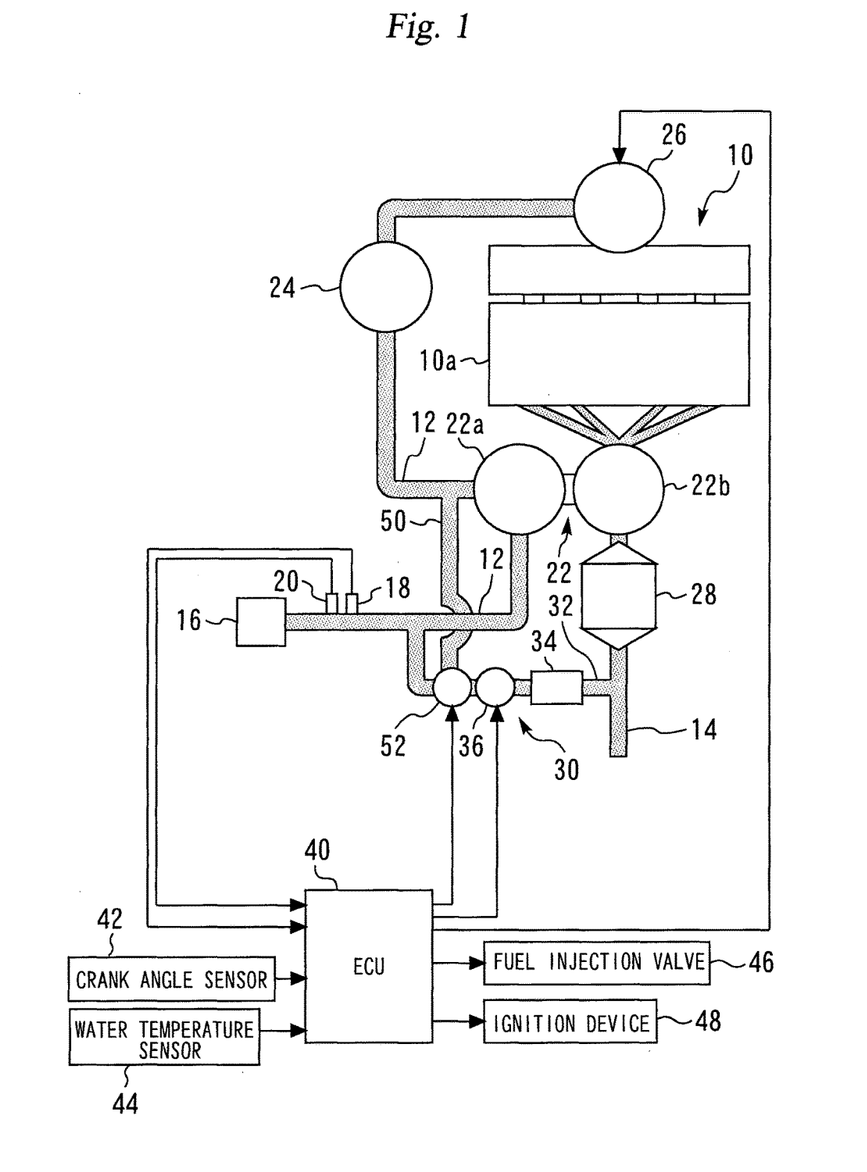
FIG. 1 is a diagram for schematically illustrating a system configuration of an internal combustion engine according to an embodiment 1 of the present invention.

FIG. 1 is a diagram for schematically illustrating a system configuration of an internal combustion engine 10 according to an embodiment 1 of the present invention. The system according to this embodiment includes the internal combustion engine (a spark ignition engine, for example) 10. Each cylinder of the internal combustion engine 10 is in communication with an intake channel 12 and an exhaust channel 14.

An air cleaner 16 is attached to the intake channel 12 at a point in the vicinity of an inlet thereof. An air flowmeter 18 that outputs a signal responsive to the flow rate of air sucked into the intake channel 12 and an intake air temperature sensor 20 that detects the temperature of the intake air are provided at a point downstream of, and in the vicinity of, the air cleaner 16. A compressor 22a of a turbocharger 22 is installed downstream of the air flowmeter 18. The compressor 22a is connected to and integrated with a turbine 22b disposed in the exhaust channel 14 by a connecting shaft.

An intercooler 24 that cools air compressed by the compressor 22a is provided downstream of the compressor 22a. An electronically controlled throttle valve 26 is provided downstream of the intercooler 24. The exhaust channel 14 is provided with an upstream-side catalyst (S/C) 28 as an exhaust gas purifying catalyst for purifying exhaust gas at a point downstream of the turbine 22b. The upstream-side catalyst 28 in this example is a three way catalyst.

The internal combustion engine 10 shown in FIG. 1 is provided with a low pressure loop (LPL) EGR device 30. The EGR device 30 includes an EGR channel 32 that connects the exhaust channel 14 downstream of the turbine 22b and the intake channel 12 upstream of the compressor 22a to each other. An EGR cooler 34 and an EGR valve 36 are provided at midpoints in the EGR channel 32, the EGR cooler 34 being located upstream of the EGR valve 36 along the flow of the EGR gas introduced into the intake channel 12. The EGR cooler 34 is a water-cooling cooler provided for cooling the EGR gas flowing in the EGR channel 32. The EGR valve 36 is provided for adjusting the amount of EGR gas to be recirculated to the intake channel 12 through the EGR channel 32. A housing (not shown) of the EGR valve 36 is heated by engine cooling water.

The system according to this embodiment is characterized by the configuration of the EGR valve 36 and its periphery. The characteristic configuration will be described in detail with reference to FIGS. 2 and 3. The system shown in FIG. 1 includes an electronic control unit (ECU) 40. Various types of sensors that detect the operational state of the internal combustion engine 10, such as the air flowmeter 18 and the intake air temperature sensor 20 described above, a crank angle sensor 42 that detects the engine speed, and a water temperature sensor 44 that detects the temperature of engine cooling water, are connected to an input part of the ECU 40. On the other hand, various types of actuators that control the operation of the internal combustion engine 10, such as the throttle valve 26 and the EGR valve 36 described above, a fuel injection valve 46 that injects fuel into a cylinder or intake port of the internal combustion engine 10, and an ignition device 48 that ignites an air-fuel mixture in the cylinder, are connected to an output part of the ECU 40. The ECU 40 controls the operation of the internal combustion engine 10 by making the various types of actuators operate based on outputs of the various types of sensors described above according to a predetermined program.

[Problem of LPL EGR Device]

In the early stage of warming up after starting from the cold state, the EGR valve 36 is typically closed in order to ensure good combustion and because water condensation tends to occur. Although the EGR valve 36 is closed, however, the EGR channel 32 upstream of the EGR valve 36 (on the side closer to the exhaust channel 14) along the flow of the EGR gas is filled with exhaust gas because of exhaust pulsation, and gas exchange constantly occurs there. Therefore, moisture in the exhaust gas can condense on the cold EGR valve 36. Thus, in the cold state during which the EGR valve 36 is closed, water condensation can occur on the surface of the EGR valve 36 on the side of the exhaust channel 14 and its vicinity.

If the EGR valve 36 is opened to introduce the EGR gas without any consideration on the occurrence of water condensation on the EGR valve 36 described above, the condensate water flows into the intake channel 12. As a result, there is a possibility that a component of an intake system corrodes. In the case where the EGR gas is introduced to the intake channel 12 upstream of the compressor 22a as with the internal combustion engine 10 according to this embodiment, not only the corrosion of the compressor 22a but also wear (erosion) of the compressor 22a because of collision of the condensate water can occur. Although introduction of the EGR gas can be inhibited until the internal combustion engine 10 is completely warmed up and the condensate water on the EGR valve 36 disappears, it takes a long time to completely warm up the internal combustion engine 10 to remove (evaporate) the condensate water, and the effect of the EGR gas introduction on improvement of the fuel consumption cannot be achieved during that period.

[Characteristic Configuration of EGR Valve and its Periphery]

Figure 2:
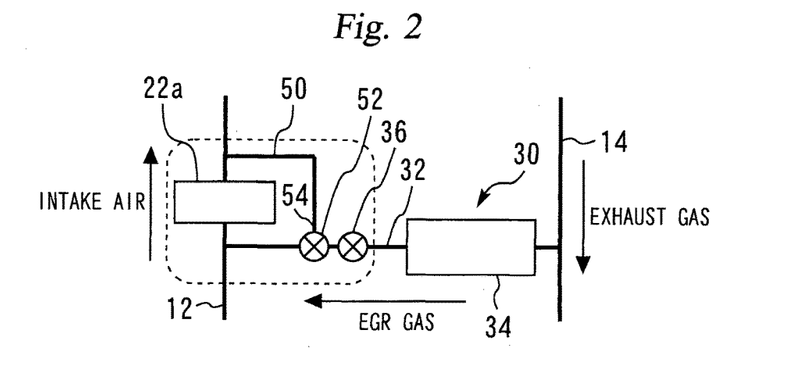
FIG. 2 is a diagram showing a characteristic configuration of an EGR valve and its periphery shown in FIG. 1.

FIG. 2 is a diagram showing a characteristics configuration of the EGR valve 36 and its periphery shown in FIG. 1. In this embodiment, to solve the problem described above, an intake bypass channel 50 and a bypass valve 52 shown in FIG. 2 are provided. The intake bypass channel 50 connects the intake channel 12 downstream of the compressor 22a and the EGR channel 32 immediately downstream the EGR valve 36 along the direction of the flow of the EGR gas at the time when the EGR gas is introduced. The bypass valve 52 is disposed at a connection 54 (see FIG. 3) between the intake bypass channel 50 and the EGR channel 32. The bypass valve 52 is electrically connected to the ECU 40.

Figure 3A:
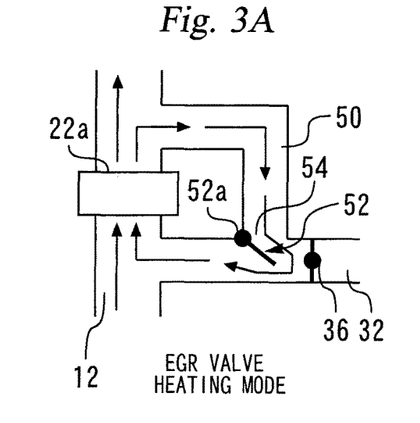
FIG. 3A includes enlarged diagrams showing configurations of the part enclosed in the dashed line frame in FIG. 2.
Figure 3B:
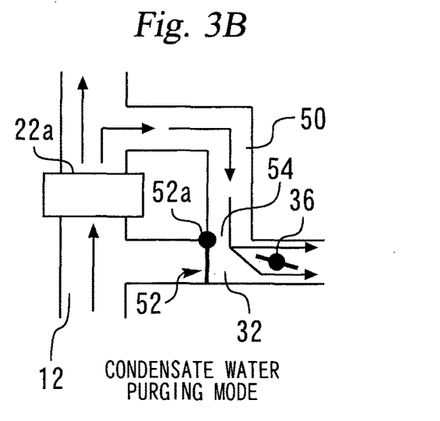
FIG. 3B includes enlarged diagrams showing configurations of the part enclosed in the dashed line frame in FIG. 2.
Figure 3C:
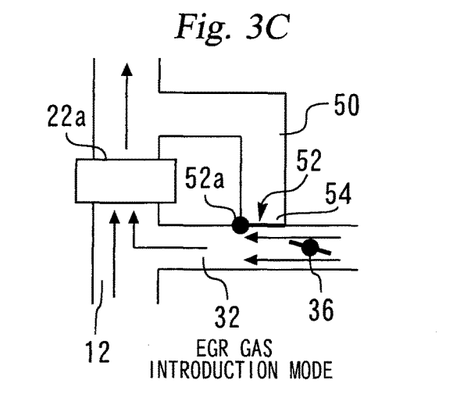
FIG. 3C includes enlarged diagrams showing configurations of the part enclosed in the dashed line frame in FIG. 2.

Each FIGS. 3A, 3B, and 3C includes enlarged diagrams showing configurations of the part enclosed in the dashed line frame in FIG. 2. FIGS. 3A, 3B, and 3C show various configurations of flow channels provided by controlling the EGR valve 36 and the bypass valve 52. As shown in FIGS. 3A, 3B, and 3C, a rotation shaft 52a of the bypass valve 52 is provided at an end of the connection 54 opposite to the portion where the EGR valve 36 is provided (an end of the intake bypass channel 50 opening into the EGR channel 32). The opening degree of the bypass valve 52 can be arbitrarily adjusted between a state where the intake bypass channel 50 is opened and the EGR channel 32 (downstream of the connection 54 along the flow of the EGR gas) is blocked (shown in FIG. 3B) and a state where the intake bypass channel 50 is closed and the EGR channel 32 is opened (shown in FIG. 3C).

First, a basic control state of the bypass valve 52 is a state where the opening degree is adjusted so that the intake bypass channel 50 is blocked and the EGR channel 32 is opened. In this control state, as a configuration of the flow channel of the intake air flowing through the intake channel 12, a first flow channel configuration is formed. The first flow channel configuration is a flow channel configuration in which the intake air having passed through the compressor 22a flows into the cylinder through the intake channel 12. More specifically, when the first flow channel configuration is formed, if the EGR valve 36 is closed, the intake air passes through the compressor 22a and then passes through the intake channel 12 to flow into the cylinder. On the other hand, when the first flow channel configuration is formed, if the EGR valve 36 is opened, an amount of EGR gas determined according to the opening degree of the EGR valve 36 is introduced from the EGR channel 32 into the intake channel 12 upstream of the compressor 22a. Therefore, in this case, as shown in FIG. 3C, a gas mixture of the EGR gas and the intake air passes through the compressor 22a and then passes through the intake channel 12 to flow into the cylinder (EGR gas introduction mode).

Next, as shown in FIG. 3A, in a state where the EGR valve 36 is closed, and the opening degree of the bypass valve 52 is adjusted to be an intermediate opening degree (such an opening degree that neither the intake bypass channel 50 nor the EGR channel 32 is blocked), as a configuration of the flow channel of the intake air flowing through the intake channel 12, a second flow channel configuration is formed. The second flow channel configuration is a flow channel configuration in which part of the intake air having passed through the compressor 22a passes through the intake bypass channel 50 and the EGR channel 32 and is recirculated to the intake channel 12 upstream of the compressor 22a. When the second flow channel configuration is selected, the flow rate of the intake air flowing through the intake bypass channel 50 can be adjusted by adjusting the opening degree of the bypass valve 52. More specifically, the flow rate can be increased by adjusting the opening degree of the bypass valve 52 so as to move the bypass valve 52 away from a position to block the intake bypass channel 50 or the EGR channel 32 (toward the intermediate position).

Furthermore, as shown in FIG. 3B, in a state where the EGR valve 36 is opened, and the bypass valve 52 opens the intake bypass channel 50 and blocks the EGR channel 32, as a configuration of the flow channel of the intake air flowing through the intake channel 12, a third flow channel configuration is formed. The third flow channel configuration is a flow channel configuration in which part of the intake air flowing through the intake channel 12 upstream of the compressor 22a passes through the intake bypass channel 50 and the EGR channel 32 to flow out into the exhaust channel 14. When the third flow channel configuration is selected, the flow rate of the intake air flowing out to the exhaust channel 14 can be adjusted by adjusting the opening degree of the EGR valve 36. More specifically, the flow rate of the intake air flowing out to the exhaust channel 14 can be increased by increasing the opening degree of the EGR valve 36.

[Characteristic Control in Embodiment 1]
(EGR Valve Heating Mode)

In this embodiment, using the configuration of the EGR valve 36 and its periphery described above, the control described below is conducted during operation of the internal combustion engine 10. When the internal combustion engine 10 starts being warmed up (that is, immediately after starting from the cold state), water condensation can occur on the EGR valve 36 as described above. In view of this, at the same time as starting warming up the internal combustion engine 10, the EGR valve 36 and the bypass valve 52 are controlled to select the second flow channel configuration shown in FIG. 3A.

The intake bypass channel 50 is connected to the EGR channel 32 immediately downstream of the EGR valve 36 along the direction of the flow of the EGR gas. Therefore, when the second flow channel configuration is selected, the intake air flowing from the intake bypass channel 50 into the EGR channel 32 passes through the EGR channel 32 while being in contact with the EGR valve 36. The temperature of the intake air flowing into the intake bypass channel 50 always increases because the intake air is compressed by the compressor 22a. Therefore, under this control, since the intake air whose temperature has been increased by the compressor 22a comes into with the EGR valve 36, the temperature of the EGR valve 36 can be more quickly increased than in the case where the EGR valve 36 is heated by the engine cooling water recirculated to the housing. In this way, occurrence of water condensation on the EGR valve 36 and its periphery can be prevented, or any condensate water can be removed (evaporated). In the following, the control mode in which the second flow channel configuration is selected to increase the temperature of the EGR valve 36 will be referred to as an EGR valve heating mode.

In addition, the temperature of the intake air used as a heat source for increasing the temperature of the EGR valve 36 in this embodiment quickly increases because the intake air is compressed by the compressor 22a, and therefore, the supercharged air increased in temperature can be used immediately after starting warm-up. In addition, in the position of the bypass valve 52 in this embodiment, as shown in FIG. 3A, the direction of the flow of the intake air flowing from the intake bypass channel 50 into the EGR channel 32 is bent toward the EGR valve 36 by the bypass valve 52. As a result, the intake air increased in temperature can be more effectively applied to the EGR valve 36. As can be seen from these facts, in the EGR valve heating mode, the temperature of the EGR valve 36 can be effectively quickly increased.

(Condensate Water Purging Mode)

Even if the condensate water on the EGR valve 36 and its periphery is eliminated in the EGR valve heating mode, there is a possibility that there is condensate water in the upstream part of the EGR channel 32 distant from the EGR valve 36 including the interior of the EGR cooler 34. If the EGR gas is introduced under such a condition, the condensate water flows into the intake channel 12. During the warm-up period, such a condition basically occurs immediately after starting the EGR valve heating mode. In view of this, in this embodiment, once the state where there is no condensate water on the EGR valve 36 and its periphery is achieved in the EGR valve heating mode, the EGR valve 36 and the bypass valve 52 are controlled to select the third flow channel configuration shown in FIG. 3B before introducing the EGR gas.

If the third flow channel configuration is selected under the condition where there is condensate water in the EGR channel 32 including the interior of the EGR cooler 34, part of the intake air compressed by the compressor 22a flows into the intake bypass channel 50 and flows back toward the exhaust channel 14 in the EGR channel 32. The backward flow of the intake air can remove the condensate water dwelling in the EGR channel 32 by pushing the condensate water to the exhaust channel 14. In the following, the control mode in which the third flow channel configuration is selected to remove the condensate water in the EGR channel 32 including the interior of the EGR cooler 34 will be referred to as a condensate water purging mode. The condensate water pushed out into the exhaust channel 14 is discharged to the outside through the exhaust channel 14, so that there is no possibility that the condensate water presents a problem with the internal combustion engine 10 and a vehicle on which the internal combustion engine 10 is mounted.

(Specific Processing in Embodiment 1)

Figure 4:
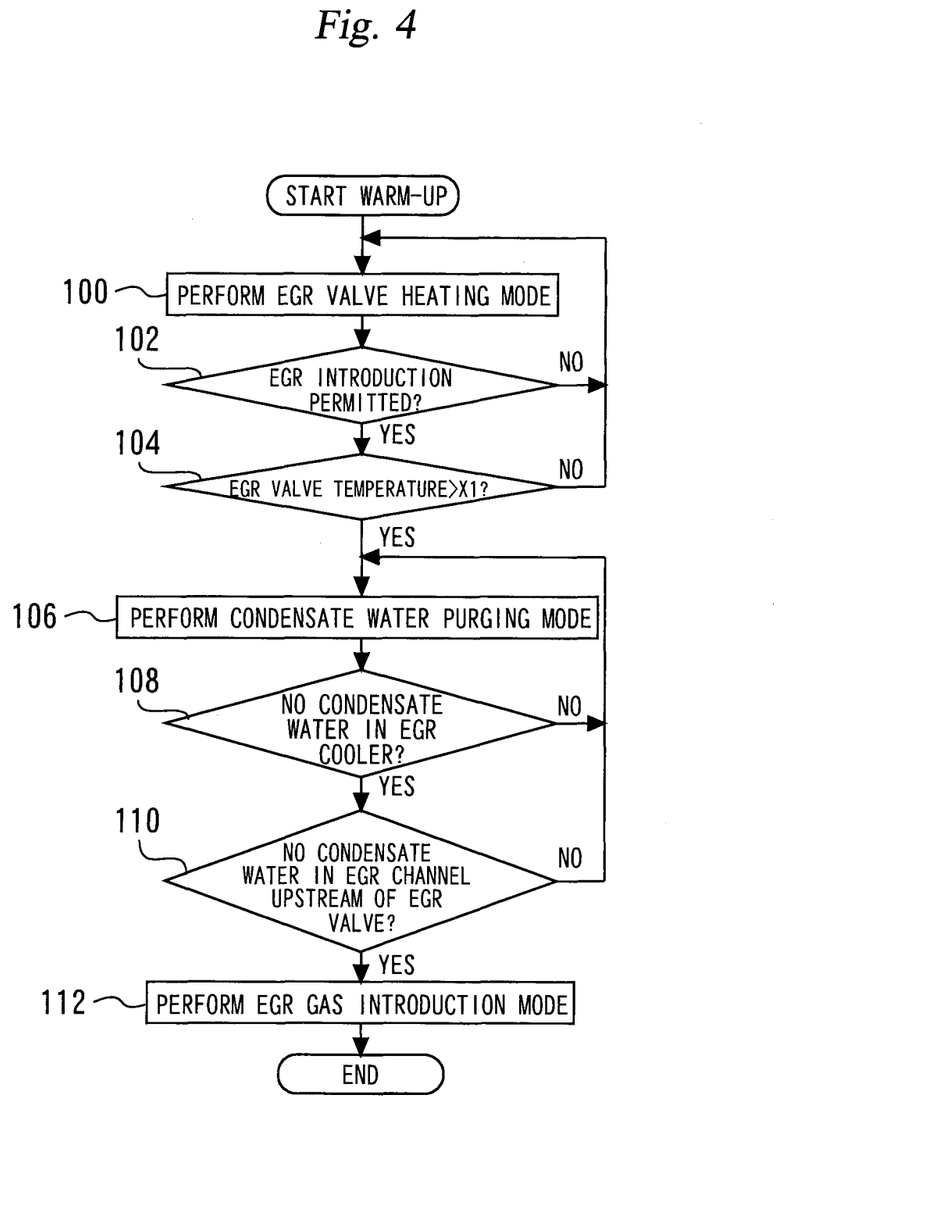
FIG. 4 is a flow chart showing a routine conducted in the embodiment 1 of the present invention.

FIG. 4 is a flow chart showing a control routine conducted by the ECU 40 to achieve the characteristic control according to the embodiment 1 of the present invention. This routine is activated when the internal combustion engine 10 is started from the cold state (that is, when the internal combustion engine 10 starts being warmed up).

In the routine shown in FIG. 4, in step 100, the ECU 40 first performs the EGR valve heating mode. More specifically, in order to form the second flow channel configuration, the state where the EGR valve 36 is closed is maintained, and the bypass valve 52 is controlled. Note that if an excessive amount of air is bypassed to the intake bypass channel 50 in the EGR valve heating mode, the amount of air to fill the cylinder becomes insufficient. Therefore, the opening degree of the bypass valve 52 is appropriately adjusted to ensure an amount of air necessary to fill the cylinder.

Next, the ECU 40 proceeds to step 102, in which it is determined whether a water temperature condition that permits introduction of the EGR gas is established or not. More specifically, it is determined whether the temperature of the engine cooling water is higher than a predetermined value or not. If the temperature of the engine cooling water is too low, bad combustion occurs in the internal combustion engine 10. The predetermined value is previously set as a threshold used to determine whether or not the temperature of the engine cooling water has reached a temperature at which good combustion occurs.

If the result of the determination in step 102 is negative, the ECU 40 returns to step 100. If the result of the determination in step 102 is positive, that is, if the water temperature condition that permits introduction of the EGR gas is established, the ECU 40 proceeds to step 104, in which it is determined whether or not the temperature of the EGR valve is higher than a predetermined value X1. The predetermined value X1 is a temperature at which condensation starts occurring on the EGR valve 36 (that is, the dew point of the exhaust gas on the EGR valve 36 and its periphery). The processing in this step 104 is to determine whether water condensation has occurred on the EGR valve 36 or not, or whether water condensation can occur or not.

Figure 5:
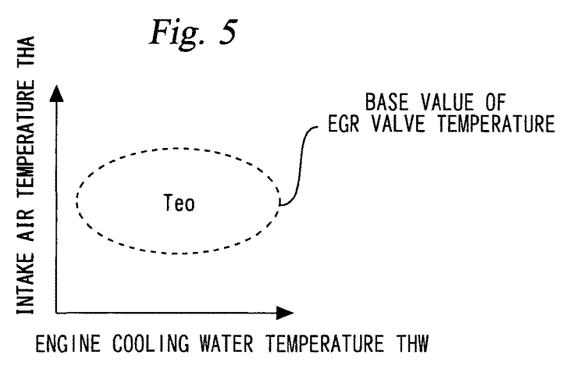
FIG. 5 is a diagram for illustrating a method of estimating the temperature of the EGR valve.

The EGR valve temperature can be estimated as a value calculated as a function of the intake air temperature THA, the engine cooling water temperature THW, and time, for example. FIG. 5 is a diagram for illustrating a method of estimating the temperature of the EGR valve 36. The ECU 40 stores a map that determines a base value Teo of the temperature of the EGR valve 36 from a relationship between the intake air temperature THA and the engine cooling water temperature THW as shown in FIG. 5. The base value Teo referred to herein means a steady temperature of the EGR valve 36 in the case where the intake air temperature THA and the engine cooling water temperature THW are arbitrary values.

In this step 104, the value Teo for the intake air temperature THA detected by the intake air temperature sensor 20 and the engine cooling water temperature THW detected by the water temperature sensor 44 is determined by referring to the map shown in FIG. 5. Then, based on the value Teo, a current temperature Tn of the EGR valve 36, which varies with the intake air temperature THA and the engine cooling water temperature THW with a temporal delay, is calculated according to the formula (1). In the formula (1), $T_{n-1}$ denotes the previous value of the temperature of the EGR valve 36, and k denotes a preset smoothing coefficient (0<k<1). It is assumed that the water temperature sensor 44 measures, as the engine cooling water temperature THW, the temperature of the housing of the EGR valve 36 at a point where the temperature is correlated with the engine cooling water temperature THW.

[Expression 1]

$$T_n = T_{n-1} + (T_{eo} - T_{n-1}) \times k \quad (1)$$

If the result of the determination in step 104 is negative, the ECU 40 returns to step 100. If the result of the determination in step 104 is positive, that is, if it is determined that there is no condensate water on the EGR valve 36 and its periphery, the ECU 40 proceeds to step 106. In step 106, the ECU 40 performs the condensate water purging mode. More specifically, in order to form the third flow channel configuration described above, the EGR valve 36 is opened, and the bypass valve 52 is controlled. Note that if an excessive amount of air flows to the EGR channel 32 in the condensate water purging mode, the amount of air to fill the cylinder becomes insufficient. Therefore, the opening degree of the EGR valve 36 is appropriately adjusted to ensure an amount of air necessary to fill the cylinder.

Next, the ECU 40 proceeds to step 108, in which it is determined whether there is condensate water in the EGR cooler 34 or not. The ECU 40 stores a first decision value of the duration of the condensate water purging mode required to remove the condensate water under a condition where there is condensate water in the EGR cooler 34, the first decision value being determined based on the result of an experiment or the like conducted in advance. It is assumed that the result of the determination in this step 108 is positive if the duration of the condensate water purging mode reaches the first decision value. Note that the determination in this step 108 is not limited to the specific example described above. That is, there may be an additional temperature sensor that measures the temperature of an inner wall of the EGR cooler 34, and it may be assumed that the result of the determination in this step 108 is positive if the temperature measured by the additional temperature sensor is higher than the dew point of the EGR gas.

If the result of the determination in step 108 is negative, the ECU 40 returns to step 106. If the result of the determination in step 108 is positive, that is, if it is determined that there is no condensate water in the EGR cooler 34, the ECU 40 proceeds to step 110. In step 110, the ECU 40 determines whether or not there is condensate water in the EGR channel 32 upstream of the EGR valve 36 along the flow of the EGR gas. The ECU 40 stores a second decision value of the duration of the condensate water purging mode required to remove the condensate water under a condition where there is condensate water in the EGR channel 32, the second decision value being determined based on the result of an experiment or the like conducted in advance. It is assumed that the result of the determination in this step 110 is positive if the duration of the condensate water purging mode reaches the second decision value. Note that the determination in this step 110 is not limited to the specific example described above. That is, there may be an additional temperature sensor that measures the temperature of an inner wall of the EGR channel 32, and it may be assumed that the result of the determination in this step 110 is positive if the temperature measured by the additional temperature sensor is higher than the dew point of the EGR gas.

If the result of the determination in step 110 is negative, the ECU 40 returns to step 106. If the result of the determination in step 110 is positive, that is, if it is determined that there is no condensate water in the EGR channel 32, the ECU 40 proceeds to step 112 and performs the EGR gas introduction mode shown in FIG. 3C. In this way, in the case where the water temperature condition that permits introduction of the EGR gas is established, and it is determined that there is no condensate water on the EGR valve 36 and its periphery, in the EGR cooler 34, and in the EGR channel 32 upstream of the EGR valve 36, introduction of the EGR gas is permitted.

Figure 6A:
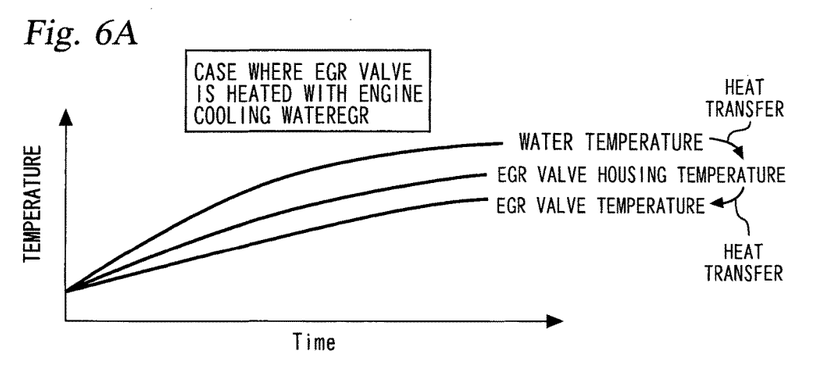
FIG. 6A includes graphs for illustrating the effect of quickly increasing the temperature of the EGR valve in an EGR valve heating mode.
Figure 6B:
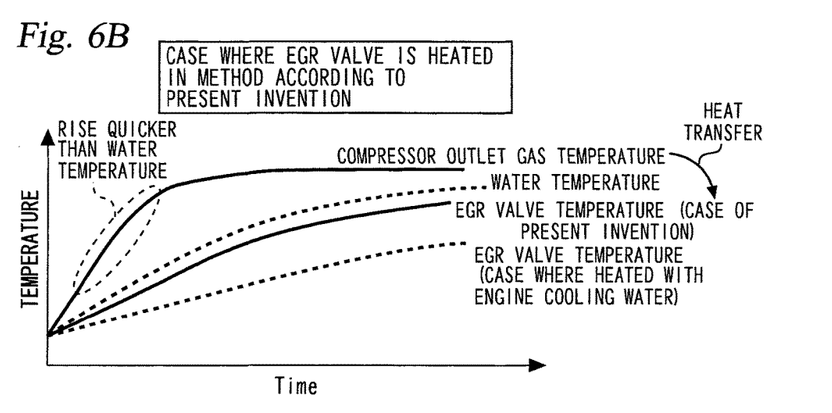
FIG. 6B includes graphs for illustrating the effect of quickly increasing the temperature of the EGR valve in an EGR valve heating mode.

According to the routine shown in FIG. 4 described above, during warm-up, the EGR valve 36 can be quickly heated in the EGR valve heating mode, and introduction of the EGR gas in the state where there is no condensate water on the EGR valve 36 and its periphery can be started early. In the following, with reference to FIGS. 6A and 6B, the effect of quickly increasing the temperature of the EGR valve 36 in the EGR valve heating mode will be described in detail. FIG. 6A shows warm-up of the internal combustion engine configured to indirectly heat the EGR valve with the engine cooling water, in which the EGR valve heating mode is not performed. As shown in FIG. 6A, during warm-up, the temperature of the engine cooling water increases with time. Heat is transferred from the engine cooling water to the EGR valve housing, and from the EGR valve housing to the EGR valve. Therefore, the temperature of the EGR valve during warm-up is always lower than the temperature of the engine cooling water. Thus, since it takes time to increase the temperature of the engine cooling water, and the EGR valve is indirectly heated via the EGR valve housing, it takes long to increase the temperature of the EGR valve. To the contrary, as shown in FIG. 6B, the temperature of compressor outlet gas is more quickly increased than the temperature of the engine cooling water. In addition, in the EGR valve heating mode, some of the compressor outlet gas at the raised temperature can be used to directly heat the EGR valve 36. Therefore, the temperature of the EGR valve 36 can be quickly increased.

Furthermore, according to the routine described above, the condensate water in the EGR channel 32 including the interior of the EGR cooler 34 can be removed by performing the condensate water purging mode after the EGR valve heating mode before starting introducing the EGR gas. As a result, the EGR gas can be introduced early in the state where not only the condensate water on the EGR valve 36 and its periphery but also the condensate water in the EGR device 30 is eliminated with higher reliability.

In the embodiment 1 described above, the bypass valve 52 configured as shown in FIGS. 2, 3A, 3B and 3C is used. However, flow channel switching means according to the present invention is not limited to the configuration as far as it is configured to be capable of selecting one of the first to third flow channel configurations described above. For example, the flow channel switching means may be configured as shown in FIGS. 7, 8A, 8B and 8C described below.

Figure 7:
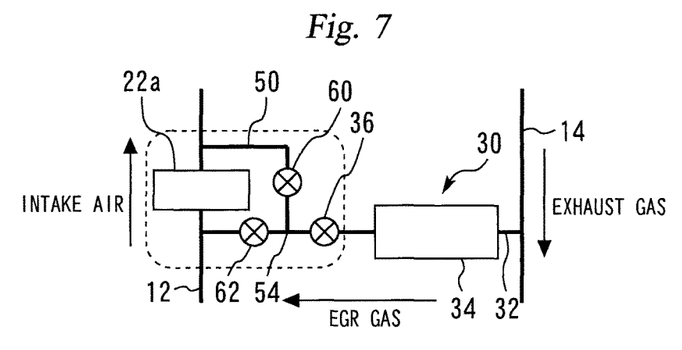
FIG. 7 is a diagram showing another example of an arrangement that provides first to third flow channel configurations.

FIG. 7 is a diagram showing another example of the arrangement that provides the first to third flow channel configurations. Each FIGS. 8A, 8B and 8C includes enlarged diagrams showing configurations of the part enclosed in the dashed line frame in FIG. 7. In FIGS. 7, 8A, 8B, and 8C, the same components as those shown in FIGS. 2, 3A, 3B and 3C described above are denoted by the same reference numerals, and descriptions thereof will be omitted or simplified. In the configuration shown in FIG. 7, a bypass valve 60 is not disposed at the connection 54 between the intake bypass channel 50 and the EGR channel 32 but is disposed at a midpoint in the intake bypass channel 50. In addition, a second EGR valve 62 is disposed in the EGR channel 32 downstream of the connection 54 along the flow of the EGR gas (on the side closer to the intake channel 12).

Figure 8A:
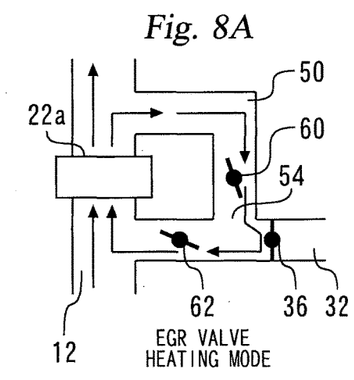
FIG. 8A includes enlarged diagrams showing configurations of the part enclosed in the dashed line frame in FIG. 7.
Figure 8B:
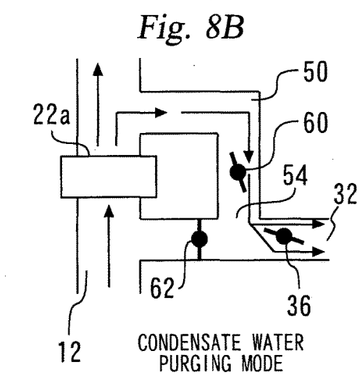
FIG. 8B includes enlarged diagrams showing configurations of the part enclosed in the dashed line frame in FIG. 7.
Figure 8C:
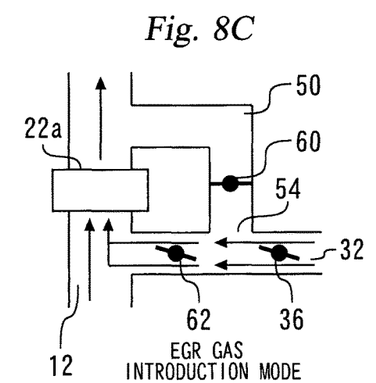
FIG. 8C includes enlarged diagrams showing configurations of the part enclosed in the dashed line frame in FIG. 7.

The configuration shown in FIG. 7 can also provide the first to third flow channel configurations. Specifically, the first flow channel configuration can be formed by closing the bypass valve 60. In the state where the first flow channel configuration is formed, if the EGR valve 36 and the second EGR valve 62 are opened, the EGR gas introduction mode can be provided as shown in FIG. 8C. If the EGR valve 36 is closed, and the bypass valve 60 and the second EGR valve 62 are opened, the second flow channel configuration used in the EGR valve heating mode can be formed as shown in FIG. 8A. Furthermore, if the EGR valve 36 and the bypass valve 60 are opened, and the second EGR valve 62 is closed, the third flow channel configuration used in the condensate water purging mode can be formed as shown in FIG. 8B.

In the embodiment 1 described above, the bypass valve 52 corresponds to the "flow channel switching means" according to the first aspect of the present invention described above. The "first controlling means" according to the third aspect of the present invention is provided by the ECU 40 performing the processing of step 100 at the start of warm-up. The "second controlling means" according to the fourth aspect of the present invention is provided by the ECU 40 performing the processing of step 106 following the processings of steps 100 to 104 at the start of warm-up. The "third controlling means" according to the fifth aspect of the present invention is provided by the ECU 40 performing the processings of steps 100 to 106 at the start of warm-up. In the modification of the embodiment 1 described above, the bypass valve 60 and the second EGR valve 62 correspond to the "flow channel switching means" according to the first aspect of the present invention.

Embodiment 2

Next, an embodiment 2 of the present invention will be described with reference to FIGS. 9 to 11.

Figure 9:
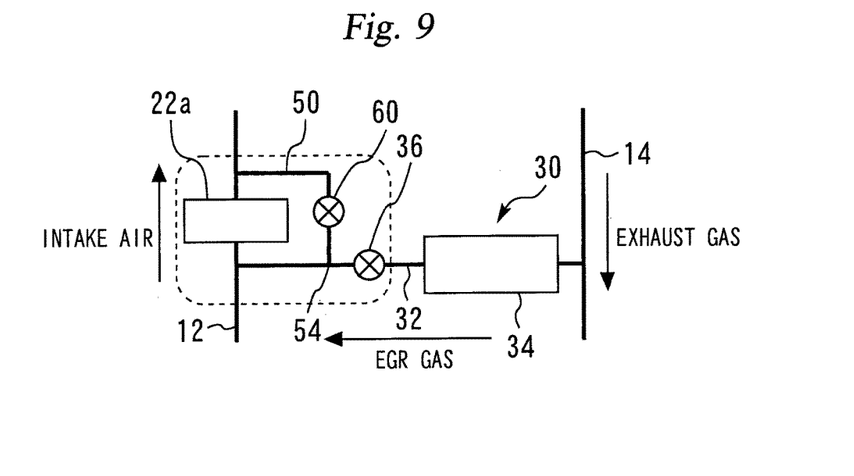
FIG. 9 is a diagram showing an example of an arrangement that provides first and second flow channel configurations in an embodiment 2 of the present invention.
Figure 10A:
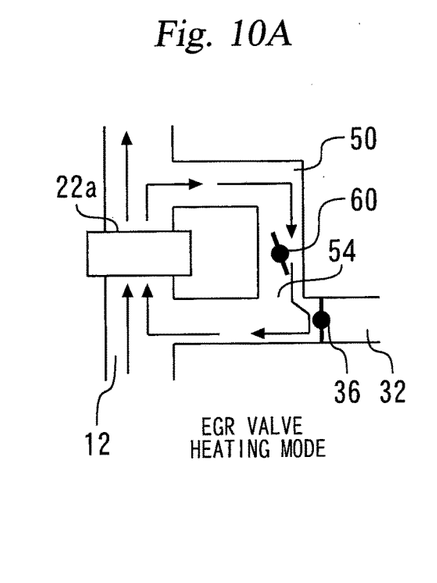
FIG. 10A includes enlarged diagrams showing configurations of the part enclosed in the dashed line frame in FIG. 9.
Figure 10B:
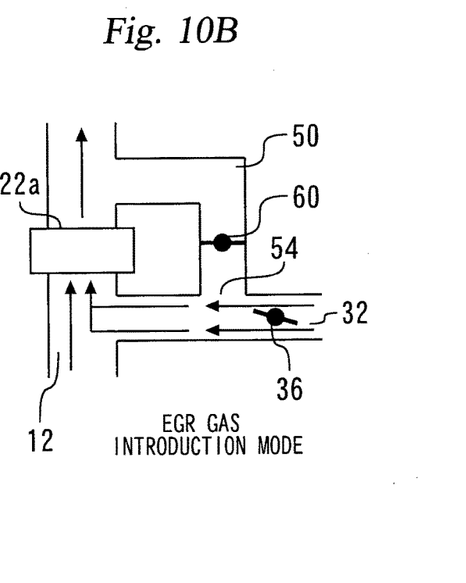
FIG. 10B includes enlarged diagrams showing configurations of the part enclosed in the dashed line frame in FIG. 9.

The hardware configuration of the internal combustion engine according to this embodiment is the same as the internal combustion engine according to the embodiment 1 except that it includes the configuration of the EGR valve and its periphery shown in FIGS. 9, 10A, and 10B instead of the configuration shown in FIGS. 2, 3A, 3B, and 3C.

In the embodiment 1 described above, during warm-up, the condensate water purging mode is performed following the EGR valve heating mode. However, the control according to the present invention does not exclusively perform the condensate water purging mode following the EGR valve heating mode. Specifically, as with the control according to this embodiment described below, the control can involve performing the EGR valve heating mode during warm-up and immediately introducing the EGR gas when a predetermined condition for EGR gas introduction is established when the EGR valve heating mode is completed.

FIG. 9 is a diagram showing an example of an arrangement that provides the first and second flow channel configurations in the embodiment 2 of the present invention. Each FIGS. 10A and 10B includes enlarged diagrams showing configurations of the part enclosed in the dashed line frame in FIG. 9. In FIGS. 9, 10A, and 10B, the same components as those shown in FIGS. 2, 3A, 3B, and 3C described above are denoted by the same reference numerals, and descriptions thereof will be omitted or simplified. Although the first and second flow channel configurations can be formed using the configurations shown in FIGS. 2, 3A, 3B, and 3C or FIGS. 7, 8A, 8B, and 8C as described above, the first and second flow channel configurations can also be formed using the configurations shown in FIGS. 9, 10A, and 10B, for example, since the third flow channel configuration is not used in this embodiment.

The configurations shown in FIGS. 9, 10A, and 10B are the same as the configurations shown in FIGS. 7, 8A, 8B, and 8C except that there is not the second EGR valve 62, and can provide the first and second flow channel configurations as described below. Specifically, the first flow channel configuration can be formed by closing the bypass valve 60. In the state where the first flow channel configuration is formed, if the EGR valve 36 is opened, the EGR gas introduction mode can be provided as shown in FIG. 10B. If the EGR valve 36 is closed, and the bypass valve 60 is opened, the second flow channel configuration used in the EGR valve heating mode can be formed as shown in FIG. 10A.

Figure 11:
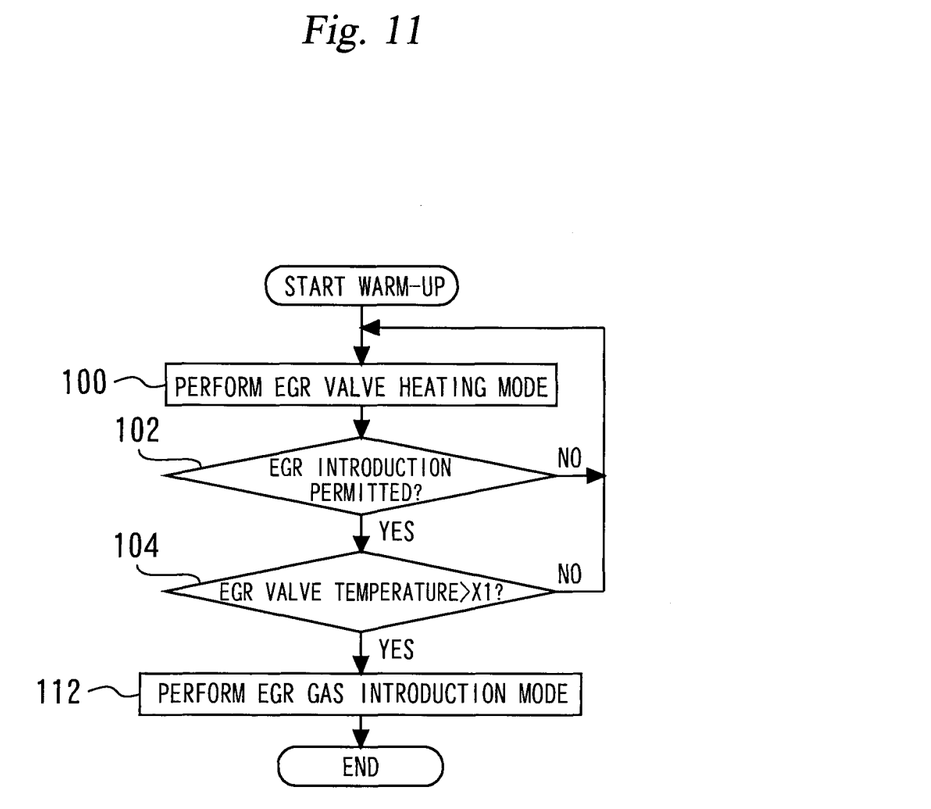
FIG. 11 is a flow chart showing a routine conducted in the embodiment 2 of the present invention.

FIG. 11 is a flow chart showing a control routine conducted by the ECU 40 to achieve the characteristic control according to the embodiment 2 of the present invention. The processings of the routine shown in FIG. 11 are the same as the processings of the routine shown in FIG. 4 described above except that the processings of steps 106 to 110 are omitted, and the bypass valve 60 is controlled in the manner shown in FIGS. 10A and 10B. According to this routine, again, the EGR valve 36 can be quickly heated in the EGR valve heating mode, and introduction of the EGR gas can be started early in the state where there is no condensate water on the EGR valve 36 and its periphery.

In the embodiment 2 described above, the bypass valve 60 corresponds to the "flow channel switching means" according to the first aspect of the present invention described above. In this embodiment, again, the "first controlling means" according to the third aspect of the present invention is provided by the ECU 40 performing the processing of step 100 at the start of warm-up.

In the embodiments 1 and 2 descried above, the control that involves performing the condensate water purging mode following the EGR valve heating mode during warm-up has been described. However, the condensate water purging mode does not always have to be performed during warm-up in conjunction with the EGR valve heating mode, as far as it is performed when water condensation occurs, or can occur, in the EGR channel 32 (including the interior of the EGR cooler 34) upstream of the EGR valve 36. For example, in the case where the vehicle is running in cold weather, if an operational condition that does not involve introduction of the EGR gas during running is continuously established, the EGR channel 32 upstream of the EGR valve 36 can be cooled by the outside air at low temperature. As a result, under such a condition, water condensation can occur in the EGR channel 32 even after warm-up. The condensate water purging mode can be independently performed under such a condition.

The EGR valve heating mode also does not always have to be performed during warm-up as described above, as far as it is performed when water condensation occurs, or can occur, on the EGR valve 36 in the state where the EGR valve 36 is closed. If the internal combustion engine is provided with the arrangement capable of heating the housing of the EGR valve 36 with the engine cooling water as with the internal combustion engine 10 described above, it can be said that the EGR valve 36 is not cooled enough for water condensation to occur during running in cold weather after warm-up. However, if the internal combustion engine is not provided with such an arrangement, for example, the EGR valve 36 may be cooled after warm-up. Thus, the EGR valve heating mode does not always have to be performed during warm-up and can also be performed under such a condition.

In the embodiments 1 and 2 described above, the turbocharger 22, which uses exhaust gas energy as a driving force, has been described as an example of a supercharging device having a compressor that supercharges intake air. However, any supercharging device having a compressor to supply supercharged intake air may be applied to the embodiment of the present invention. The compressor according to the present invention may use the motive power from the crankshaft of the internal combustion engine as a driving force or use the power from an electric motor as a driving force, for example, as far as it can supercharge the intake air. For example, in the internal combustion engine 10, a supercharger (i.e. a mechanical supercharger) may be installed instead of the turbocharger 22.

REFERENCE SIGNS LIST 10 internal combustion engine
12 intake channel
14 exhaust channel
16 air cleaner
18 air flowmeter
20 intake air temperature sensor
22 turbocharger
22a compressor
22b turbine
24 intercooler
26 throttle valve
28 upstream-side catalyst
30 EGR device
32 EGR channel
34 EGR cooler
36 EGR valve
40 ECU (electronic control unit)
42 crank angle sensor
44 water temperature sensor
46 fuel injection valve
48 ignition device
50 intake bypass channel
52, 60 bypass valve
52a rotation shaft of bypass valve
54 connection point between intake bypass channel and EGR channel
62 second EGR valve

The invention claimed is:

1. An internal combustion engine, comprising:
a compressor configured to supercharge intake air;
an EGR channel that connects an intake channel upstream of the compressor and an exhaust channel to each other;
an EGR valve disposed at an intermediate point in the EGR channel and configured to adjust a flow rate of EGR gas flowing through the EGR channel;
an intake bypass channel that connects the intake channel downstream of the compressor and the EGR channel immediately downstream of the EGR valve along a direction of a flow of the EGR gas; and
a flow channel switcher disposed at a point in the EGR channel and being adjacent to the EGR valve, and configured to select a configuration of a flow channel of the intake air flowing through the intake channel from among a first flow channel configuration in which the intake air having passed through the compressor passes through the intake channel and flows into a cylinder and a second flow channel configuration in which, in a state where the EGR valve is closed, part of the intake air increased in temperature by passing through the compressor passes through the intake bypass channel and flows into the EGR channel and touches the EGR valve and flows back out of the EGR channel and then returns to the intake channel upstream of the compressor.

2. The internal combustion engine according to claim 1, further comprising a controller programmed to control the flow channel switcher to select the second flow channel configuration when, in the state where the EGR valve is closed, water condensation occurs on the EGR valve or there is a possibility that water condensation occurs on the EGR valve.

3. The internal combustion engine according to claim 1, wherein the flow channel switcher is configured to select not only the first flow channel configuration or the second flow channel configuration but also a third flow channel configuration in which, in a state where the EGR valve is opened, part of the intake air flowing through the intake channel upstream of the compressor passes through the intake bypass channel and the EGR channel and flows out into the exhaust channel.

4. The internal combustion engine according to claim 3, further comprising a controller programmed to control the EGR valve and the flow channel switcher to select the third flow channel configuration when water condensation occurs in the EGR channel upstream of the EGR valve or there is a possibility that water condensation occurs in the EGR channel upstream of the EGR valve.

5. The internal combustion engine according to claim 3, further comprising a controller programmed to control the flow channel switcher to select the second flow channel configuration in the state where the EGR valve is closed when warm-up of the internal combustion engine is started, and for controlling the EGR valve and the flow channel switcher to select the third flow channel configuration before introducing the EGR gas from the EGR channel into the intake channel when water condensation no longer occurs on the EGR valve during selection of the second flow channel configuration.

* * * * *